United States Patent
Couwenhoven et al.

[11] Patent Number: 5,757,517
[45] Date of Patent: May 26, 1998

[54] ADAPTIVE ERROR DIFFUSION METHOD

[75] Inventors: Douglas W. Couwenhoven, Fairport; Kevin E. Spaulding, Spencerport; Rodney L. Miller, Fairport, all of N.Y.

[73] Assignee: Eastman Kodak Company, Rochester, N.Y.

[21] Appl. No.: 409,554

[22] Filed: Mar. 23, 1995

[51] Int. Cl.$^6$ .................................................. H04N 1/40
[52] U.S. Cl. .......................... 358/463; 382/252; 358/447
[58] Field of Search ................................. 358/447, 448, 358/461, 462, 465–467, 443, 456, 463; 382/251, 252, 253, 263, 264, 260, 265, 270

[56] References Cited

U.S. PATENT DOCUMENTS

| | | | |
|---|---|---|---|
| 4,654,721 | 3/1987 | Goertzel et al. | 358/459 |
| 5,051,844 | 9/1991 | Sullivan | 358/443 |
| 5,051,884 | 9/1991 | Iida | 364/148 |
| 5,070,413 | 12/1991 | Sullivan et al. | 358/456 |
| 5,325,211 | 6/1994 | Eschbach | 382/252 |
| 5,387,987 | 2/1995 | Kwon et al. | 358/447 |

*Primary Examiner*—Joseph Mancuso
*Assistant Examiner*—Jerome Grant, II
*Attorney, Agent, or Firm*—Peyton C. Watkins

[57] ABSTRACT

An error diffusion method suitable for producing an output image from an input image having a set of digitized continuous-tone pixels is disclosed. The method includes the steps of computing an image activity signal; computing a set of activity weights from the image activity signal; computing a filtered input value for a digitized continuous-tone input pixel responsive to the activity weights and computing a filtered output value responsive to the activity weights for each of the possible output levels. The method further includes selecting the output level in response to the filtered input value and the filtered output value for each of the possible output levels according to an error criterion; determining an error signal between the filtered input value and the filtered output value for the selected output level; and weighting the error signal and adjusting the filtered input values for nearby pixels which have not yet been processed.

23 Claims, 18 Drawing Sheets

| -0.009 | -0.010 | 0.004 | 0.021 | 0.004 | -0.010 | -0.009 |
|--------|--------|-------|-------|-------|--------|--------|
| -0.010 | -0.018 | 0.007 | 0.051 | 0.007 | -0.018 | -0.010 |
| 0.004  | 0.007  | 0.079 | 0.190 | 0.079 | 0.007  | 0.004  |
| 0.021  | 0.051  | 0.190 | 0.368 |       |        |        |

40

| -0.002 | -0.002 | -0.002 | -0.002 | -0.001 | 0.000 | 0.002 | 0.002 | 0.001 | 0.000 | -0.001 | -0.002 | -0.002 | -0.002 | -0.002 |
|---|---|---|---|---|---|---|---|---|---|---|---|---|---|---|
| -0.003 | -0.003 | -0.003 | -0.003 | -0.002 | -0.001 | 0.003 | 0.004 | 0.002 | 0.001 | -0.001 | -0.002 | -0.003 | -0.003 | -0.002 |
| -0.003 | -0.003 | -0.004 | -0.005 | -0.003 | -0.002 | 0.006 | 0.007 | 0.004 | 0.001 | -0.002 | -0.003 | -0.004 | -0.003 | -0.002 |
| -0.003 | -0.004 | -0.005 | -0.005 | -0.004 | -0.002 | 0.010 | 0.011 | 0.007 | 0.001 | -0.003 | -0.005 | -0.005 | -0.003 | -0.002 |
| -0.002 | -0.005 | -0.005 | -0.004 | -0.002 | 0.000 | 0.017 | 0.022 | 0.011 | 0.002 | -0.004 | -0.005 | -0.005 | -0.003 | -0.002 |
| -0.002 | -0.003 | -0.004 | -0.002 | 0.000 | 0.001 | 0.031 | 0.043 | 0.022 | 0.007 | -0.002 | -0.004 | -0.003 | -0.002 | -0.001 |
| -0.001 | 0.001 | 0.002 | 0.007 | 0.001 | 0.002 | 0.057 | 0.076 | 0.043 | 0.020 | 0.007 | 0.002 | 0.001 | 0.001 | 0.000 |
| 0.000 | 0.001 | 0.007 | 0.022 | 0.007 | 0.020 | 0.096 | 0.118 | 0.076 | 0.043 | 0.022 | 0.011 | 0.007 | 0.004 | 0.002 |
| 0.002 | 0.004 | 0.011 | 0.031 | 0.020 | 0.043 | | 0.096 | 0.057 | 0.031 | 0.011 | 0.007 | 0.004 | 0.001 | 0.000 |
| 0.003 | 0.005 | 0.010 | 0.017 | 0.031 | 0.057 | | 0.043 | 0.022 | 0.011 | 0.007 | 0.002 | 0.001 | 0.001 | 0.002 |

| -0.197 | -0.373 | -0.197 |
| --- | --- | --- |
| -0.373 | 3.28 | -0.373 |
| -0.197 | -0.373 | -0.197 |

ADAPTIVE ERROR DIFFUSION METHOD

CROSS REFERENCE TO RELATED APPLICATION

Reference is made to commonly assigned U.S. Ser. No. 08/399,678 filed Mar. 7, 1995 to Kevin E. Spaulding and Douglas W. Couwenhoven, entitled IMPROVED ERROR DIFFUSION METHOD, the teachings of which are incorporated herein.

FIELD OF THE INVENTION

The present invention relates to digital image processing and more particularly to a method for digitally halftoning a continuous-tone image using error diffusion.

BACKGROUND OF THE INVENTION

Digital halftoning is a technique employing digital image processing to produce a halftone output image from a continuous-tone input image. In the digital halftoning technique, a continuous-tone image is sampled, for example, with a scanner and the samples are digitized and stored in a computer. The digitized samples (or "pixels") consist of discrete values typically ranging from 0 to 255. To reproduce this image on an output device capable of printing dots of one gray level (e.g. black) it is necessary to create the sensation of multiple gray levels by suitably distributing the printed dots in the output image. This is accomplished by converting the continuous-tone image to a binary output image using some form of halftoning technique.

One prior art method of digital halftoning is known as error diffusion. FIG. 1 shows a block diagram describing a basic error diffusion technique. The continuous-tone input value for column i, and row j of the input image is given by $y_{i,j}$. For purposes of illustration it will be assumed that the continuous-tone input values span the range from 0 to 255. The continuous-tone input value for the current input pixel is thresholded 10 to form the output value $b_{i,j}$. The threshold operator will return a 0 for any continuous-tone input value below the threshold, and a 255 for any continuous-tone input value above the threshold. A difference signal generator 12 receives the continuous-tone input value and the output value, and produces a difference signal representing the error introduced by the thresholding process. The difference signal is multiplied by a series of error weights using a weighted error generator 14, and is provided to an adder 16 which adds the weighted difference signal to the continuous-tone input values of nearby pixels which have yet to be processed to form modified continuous-tone input values. The propagation of the errors made during the quantization process to the nearby pixels insures that the arithmetic mean of the pixel values is preserved over a local image region.

FIG. 2 illustrates a typical set of error weights 14 which can be used to distribute the errors to the nearby pixels.

FIG. 3 shows a typical image generated using this simple error diffusion technique.

An artifact that is typically associated with error diffusion halftoning techniques is known as "worms." Worms are formed when the black or white output pixels appear to string together in an area which should be otherwise uniform. Worm artifacts can be clearly seen in several areas of the sample image shown in FIG. 3, such as the light and dark ends of the gray wedge. Several of these worm artifacts are labeled as 18A–C. Many modifications to the basic error diffusion technique have been described which attempt to eliminate these worm artifacts. One such modification has been described by Goertzel et al in U.S. Pat. No. 4,654,721 issued Mar. 31, 1987. In their disclosure, each input pixel is represented by a block of output pixels. The appearance of worms is avoided by employing a random number generator to determine the distribution of error between two adjacent blocks of pixels, such that a random fraction of error is distributed to one block and the remainder of the error is distributed to the other. In another technique, sometimes called error diffusion with dither, the error criterion is randomly varied to reduce the appearance of worms. Although these techniques, and others like them, reduce the appearance of worms, they also increase the random noise in the output image. To the extent that this random noise occurs in the frequencies visible to the human viewer, the image is thereby degraded.

A more desirable approach has been disclosed by Sullivan (U.S. Pat. No. 5,051,844 issued Sep. 24, 1991). This method will be referred to as visual error diffusion. Sullivan teaches the use of a visual filter derived from the response of the human visual system to compute a visually perceived output value. The output level is chosen which gives the smallest error between the continuous-tone input value and the visually perceived output value. The error signal which is propagated to the nearby image pixels is then computed by taking the difference between the continuous-tone input value and the visually perceived output value rather than the output value itself. FIG. 4 illustrates a flow diagram for this method. The simple threshold 10 in the conventional error diffusion method has been replaced by a selector 30 which determines the output pixel value $b_{i,j}$. The selection by the selector 30 is made by using a causal visual filter 31 to filter the previously computed output pixel values together with each of the possible output levels for the current pixel 32 to compute the visually perceived output value for each possible output level. For a binary output device there will be two possible output levels corresponding to a black or a white pixel, but this method can be extended to multi-level output devices by considering more than two possible output levels. The output pixel value is chosen which gives the smallest difference between the continuous-tone input value and the visually perceived output level. The resulting error is then calculated for the current pixel by a difference signal generator 33 which computes a difference signal between the continuous-tone input value and the visually perceived output value 34. As with the conventional error diffusion technique, this difference signal is then weighted by a series of error weights $W_{i,j}$ using a weighted error generator 35, and is added 36 to the continuous-tone input values of nearby pixels which have yet to be processed to form modified continuous-tone input values. The causal visual filter function is computed from the frequency response of the human visual system as described by Sullivan. An example of a 4×7 causal visual filter function is shown in FIG. 5. The array element 40 is used to weight the possible output levels for the present pixel, and the remaining array elements are used to weight the nearby output values which have been previously computed. (This causal visual filter function is a normalized version of the one disclosed by Sullivan.) A similar 8×15 causal visual filter function is shown in FIG. 6. The size of the causal visual filter function array is related to the parameters such as viewing distance and sample spacing on the document in the equations given by Sullivan. In this case, the array element 42 is used to weight the possible output levels for the present pixel, and the remaining array elements are used to weight the nearby output values which have been previously computed. FIG. 7 shows a sample image generated using this technique with the 8×15 causal visual filter function. The worm artifacts 18A–C which were shown in FIG. 3 have been eliminated.

Although visual error diffusion has the result of reducing the appearance of worms to a large degree without the introduction of undesirable noise, a side effect of this method is that artifacts are generated near edges, lines, and isolated pixels in the image. One type of artifact can be referred to as "ghost pixels." Examples of ghost pixels artifacts 20A–C can be observed around the isolated pixels and the edges in the image shown in FIG. 7. The origin of these ghost pixel artifacts can be traced to the fact that the selection process is comparing the visually perceived output image to the unfiltered input image. So, for example, consider the case where the input image contains an isolated black pixel on a white background. The visual error diffusion technique will place white pixels in most of the area corresponding to the white background, but when it comes time to make a selection for the black pixel it will visually filter the output pixels in the surrounding area. Since most of these pixels will be white, the visually perceived output level for a white output pixel will be white, but the visually perceived output level for a black output pixel will be light gray rather than black. Since the light gray visually perceived output level will be closer to the desired black input level than the white visually perceived output level, the correct black output level will be chosen. However, the resulting error signal corresponding to the difference between the black input level and the light gray visually perceived output level will be quite large. This error will then be propagated to the surrounding continuous-tone input pixels. As a result, when the nearby white background pixels are processed, one or more of these pixels may be rendered as black output pixels.

The artifacts can be even more severe on edges between uniform patches of different gray levels where anisotropic overshoots are formed. Although this artifact has a sharpening effect on the image, it is not necessarily desirable because the degree of sharpening can not be controlled independent of the worm reduction, and additionally the effect is anisotropic so that the apparent sharpening is not symmetric. Examples of the anisotropic sharpening of edges 19A and B can be seen in FIG. 7. As with the ghost pixel artifacts, the origin of the anisotropic sharpening artifacts can be traced to the fact that the selection process is comparing the visually perceived output image to the unfiltered input image.

Ideally, it is desirable to combine the performance of the error diffusion algorithm of FIG. 1 in areas of the image that contain high spatial frequency content (edges), and the performance of the visual error diffusion algorithm in areas of the image that contain smoothly varying, low spatial frequency content.

SUMMARY OF THE INVENTION

It is an object of the present invention to eliminate the above-discussed artifacts while still providing worm reduction.

This object is achieved in an error diffusion method suitable for producing an output image from an input image having a set of digitized continuous-tone pixels, comprising the steps of:

a) computing an image activity signal;
b) computing a set of activity weights from the image activity signal;
c) computing a filtered input value for a digitized continuous-tone input pixel responsive to the activity weights;
d) computing a filtered output value responsive to the activity weights for each of the possible output levels;
e) selecting the output level in response to the filtered input value and the filtered output value for each of the possible output levels according to an error criterion;
f) determining an error signal between the filtered input value and the filtered output value for the selected output level; and
g) weighting the error signal and adjusting the filtered input values for nearby pixels which have not yet been processed.

Advantages

The present invention has the advantage that it minimizes the appearance of worm artifacts in the output image while eliminating the edge artifacts associated with the prior art visual error diffusion algorithm disclosed by Sullivan.

The present invention also has the advantage that it adapts to the local scene content by selecting a set of operating parameters that produces the best image quality for that particular type of scene content.

Another advantage of the present invention is that it permits the amount of sharpening to be adjusted independent of the amount of visual blur. Additionally, the sharpening effect can be made to be isotropic.

BRIEF DESCRIPTION OF THE DRAWINGS

FIG. 6 depicts another causal visual filter array;

DETAILED DESCRIPTION OF THE INVENTION

Figure 7:
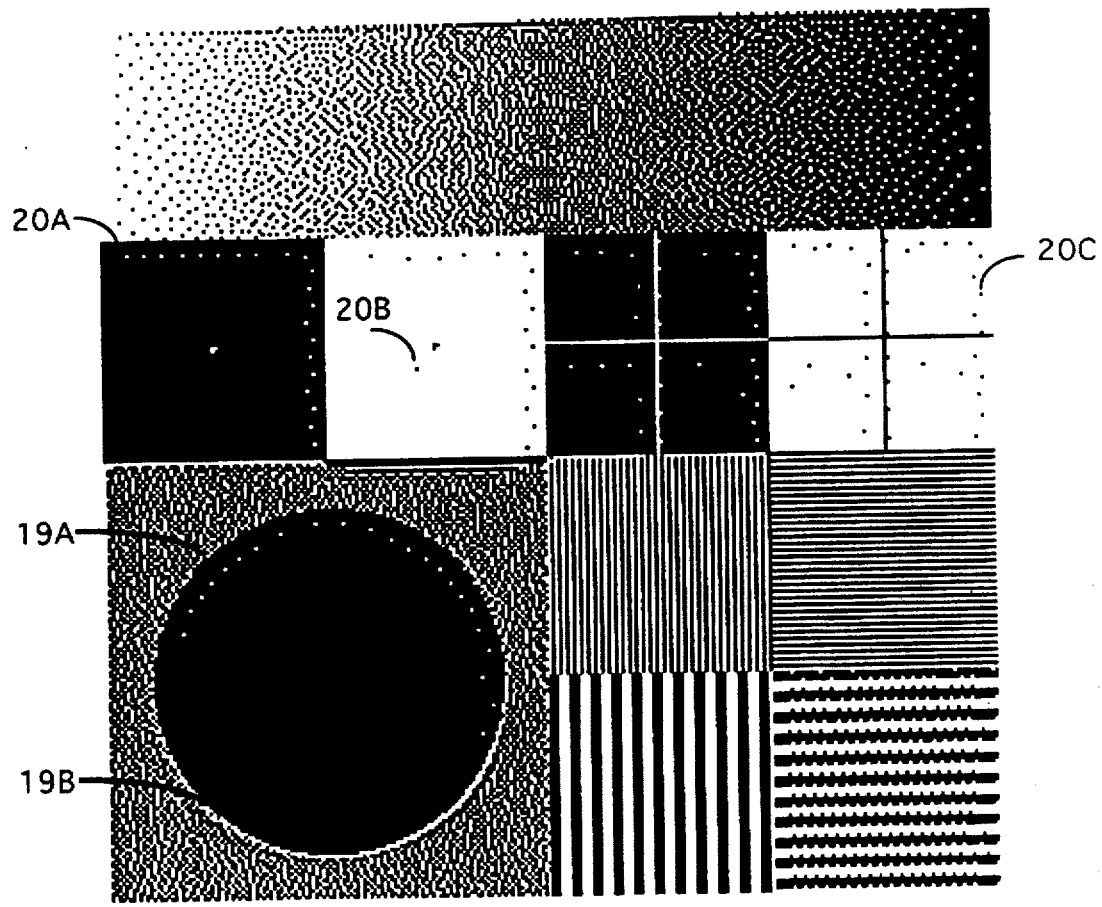
FIG. 7 depicts a sample image generated in accordance with the method of FIG. 4 which contains anisotropic edge sharpening and ghost pixel artifacts.
Figures 8, 9:
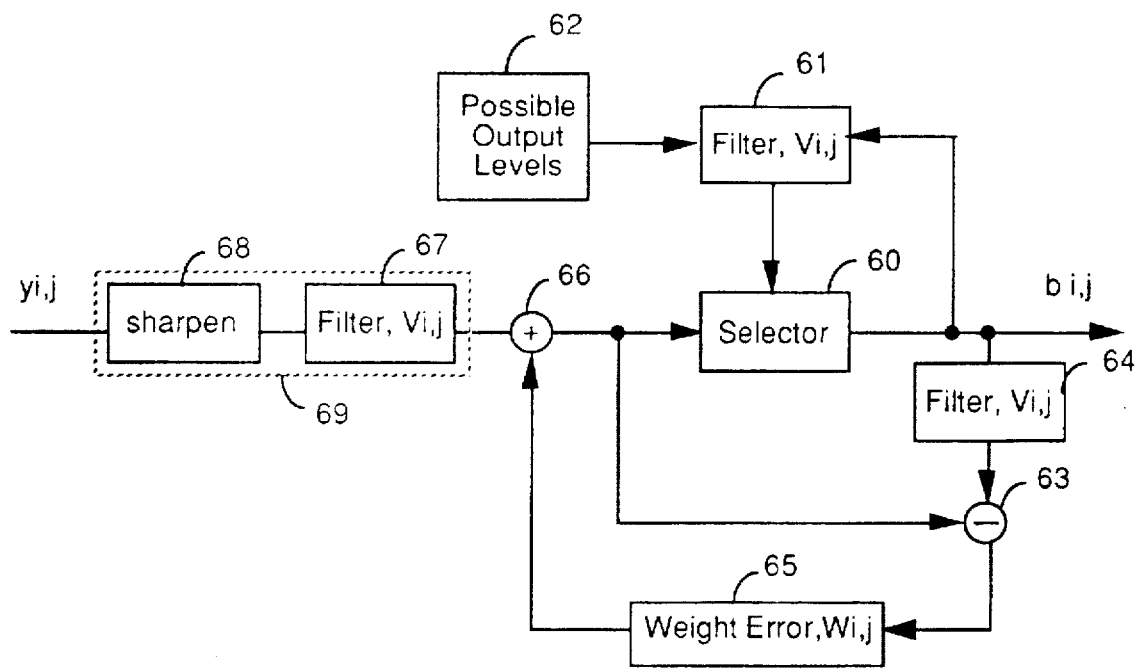
FIG. 8 is another logic diagram of an error diffusion process.
FIG. 9 depicts a sample sharpening filter which can be used in the logic of FIG. 8.
Figure 10:
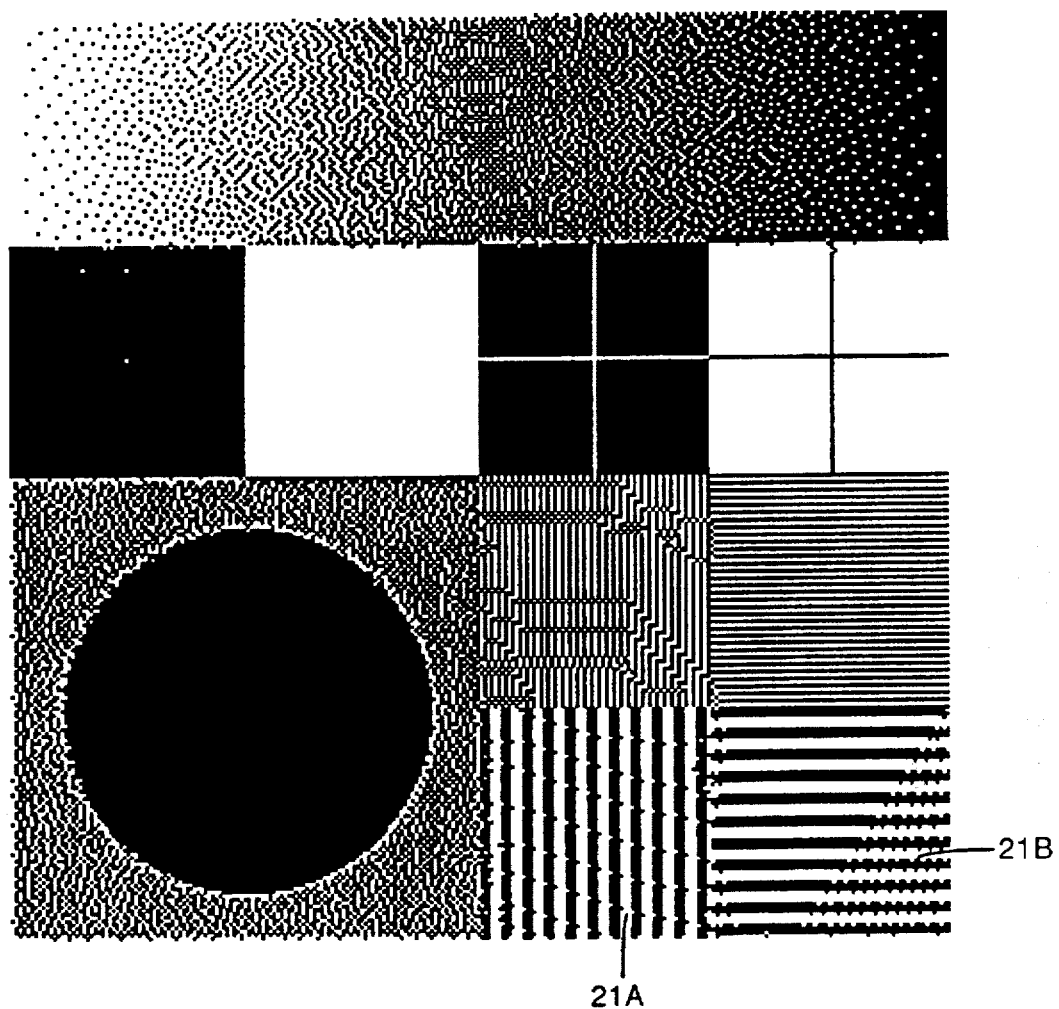
FIG. 10 depicts a sample image generated in accordance with the method of FIG. 8 which eliminates the artifacts of FIGS. 3 and 7, but contains artifacts in high contrast image regions.

As set forth in the above referenced copending application, a modification to the visual error diffusion algorithm that corrects for these undesirable artifacts has been disclosed in which a visual filter function is applied to both the input and output images during the process of determining the output value for the current pixel. The error that is propagated to nearby continuous-tone input pixels that have not been processed yet is calculated by the difference between the visually perceived input value and the visually perceived output value. This invention has the advantage that it minimizes the appearance of worm artifacts in the output image while eliminating the edge artifacts associated with the prior art visual error diffusion algorithm. A block diagram of the improved visual error diffusion algorithm is shown in FIG. 8, and a sample output image is shown in FIG. 10. One drawback of the FIG. 8 method is that in order to restore the desirable appearance of sharpness to the image, a sharpening pre-filter 68 is required. An example sharpening pre-filter, shown in FIG. 9, was used in creating the image of FIG. 10. Thus, the edges in FIG. 10 appear as sharp as the edges in FIG. 7, which was processed with the visual error diffusion method of Sullivan, but with the added advantage of being isotropic in nature. While this improvement produces a higher quality output than the previous methods, it does introduce undesirable noise 21A–B into certain areas of the image that are high in contrast and spatial frequency, such as the vertical and horizontal bars near the center right of the sample image of FIG. 10.

Figure 11:
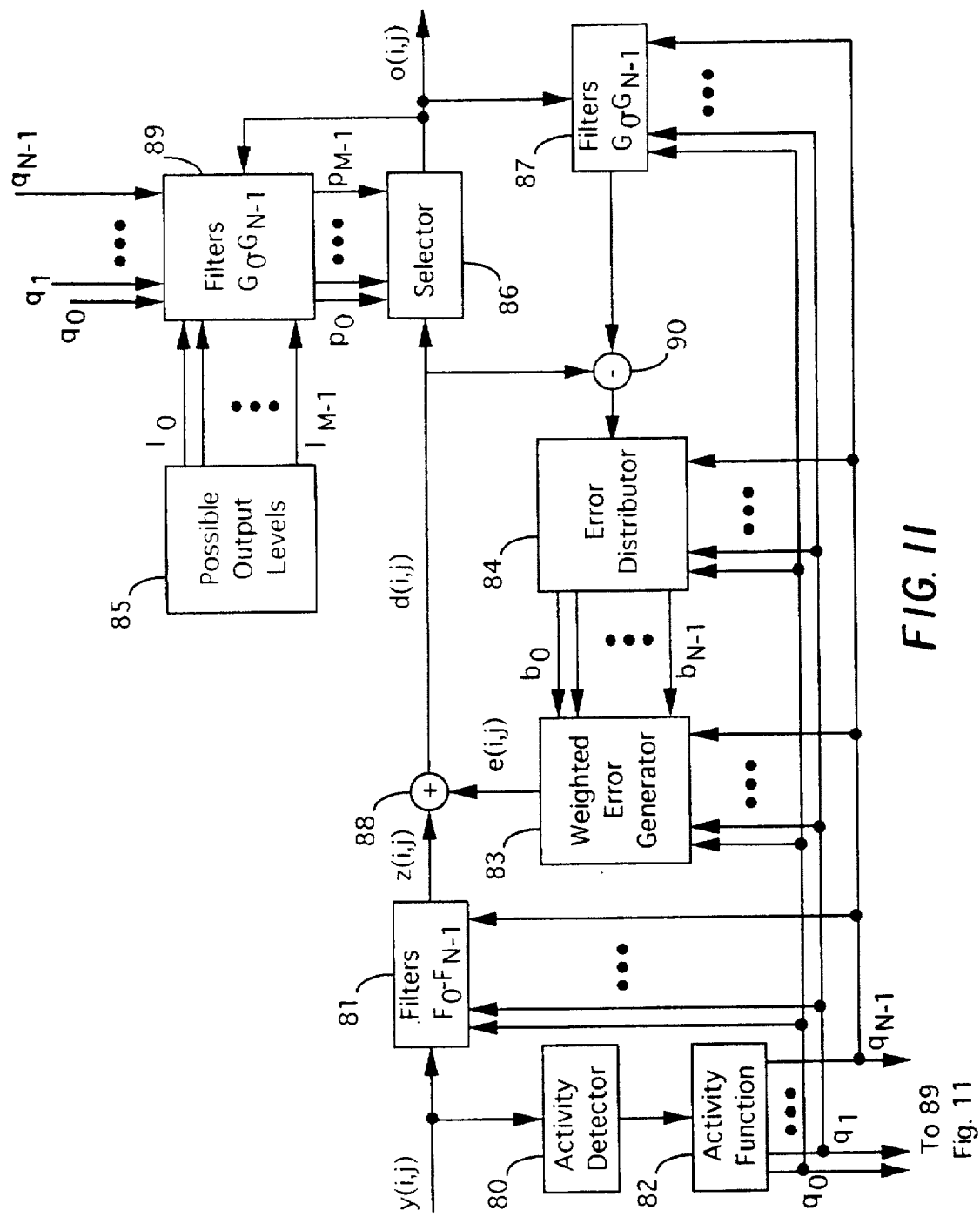
FIG. 11 is a logic diagram showing a method according to the present invention.

In the present invention, shown schematically in FIG. 11, a pixel located in row i, column j of the input image is denoted by y(i,j). An activity detector 80 uses neighboring pixels in the vicinity of y(i,j) to determine an activity signal. The activity detector 80 may take many forms, including a local range detector, local variance estimator, convolution filter, or edge detection operator such as a Sobel or Prewitt edge detection filter. In one version, the activity detector 80 uses a local range detector to compute the activity signal as the difference between the maximum and minimum input pixel values of neighboring pixels in the vicinity of y(i,j). The neighboring pixels may include the current pixel, adjacent pixels, and/or other nearby pixels. Another activity detector 80, in accordance with the invention, uses a local variance estimator to compute the activity signal as the statistical variance of the input pixel values of neighboring pixels in the vicinity of y(i,j). Still another activity detector 80 uses a convolution filter to compute the activity signal as the convolution of the convolution filter and the input pixel values of neighboring pixels in the vicinity of y(i,j). An activity detector using an edge detection operator computes the activity signal as the sum of convolutions of the input pixels of neighboring pixels in the vicinity of y(i,j) with the edge detection filters.

Figure 12:
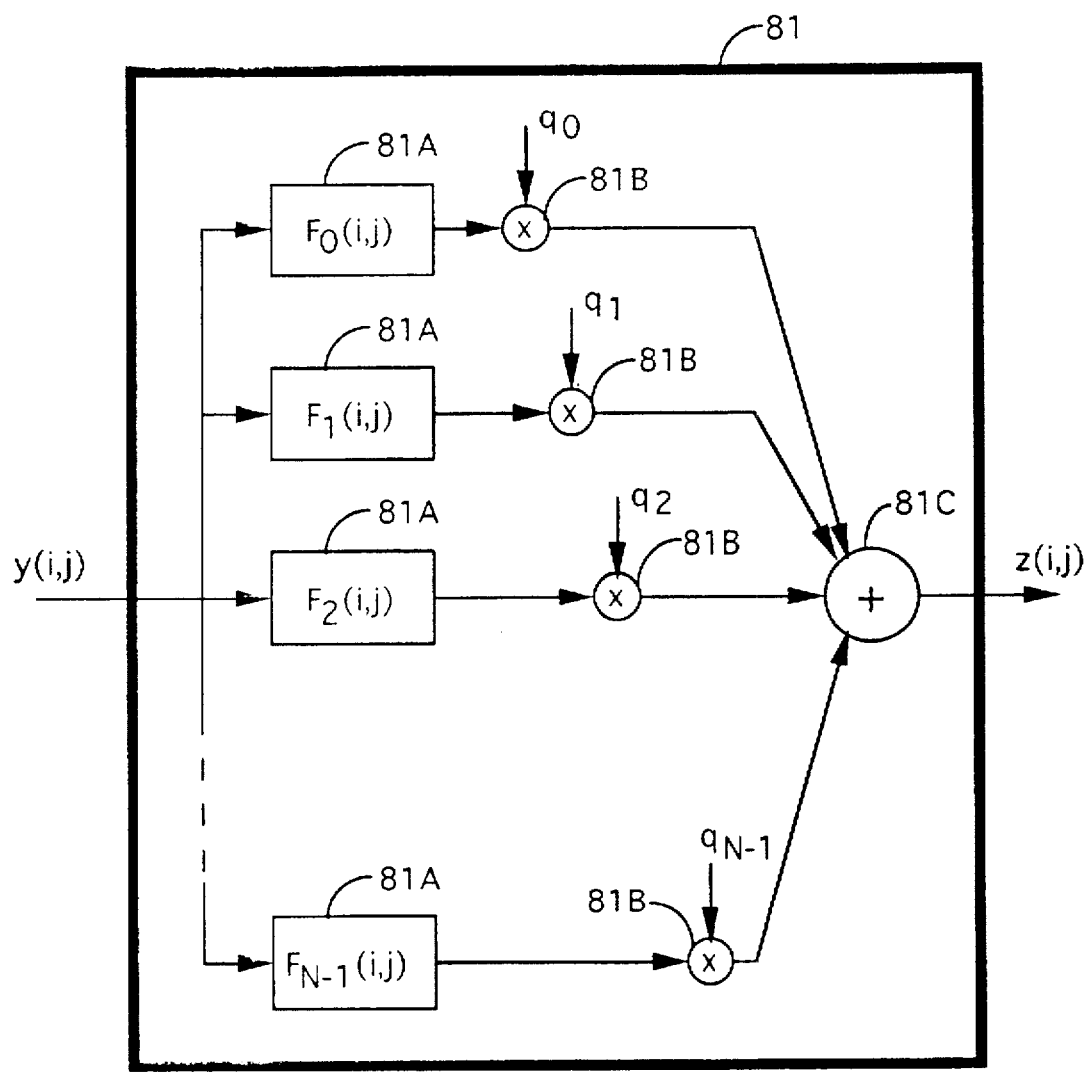
FIG. 12 is a logic diagram showing an input filtering operation according to the present invention.

The value of the activity signal is used as an index to an activity function 82 which computes a weighting vector $Q=\{q_0, q_1, \ldots, q_k, \ldots, q_{N-1}\}$. In the preferred embodiment of this invention, the activity function 82 is implemented as a lookup table that is indexed by the activity signal. The input image is also processed through an input filter processor 81, which digitally filters the input image in the vicinity of y(i,j) using filtered signal generators 81A and a bank of N separate filters $F_0(i,j)$ through $F_{N-1}(i,j)$ as shown in FIG. 12. Also in FIG. 12, the weighting vector Q is used to weight the N filtered versions of the input image using multipliers 81B, which are then added together using an adder 81C to produce a weighted filtered input signal z(i,j). The filtered input values only need to be computed for cases where the weights $q_k$ are non-zero.

Figure 13:
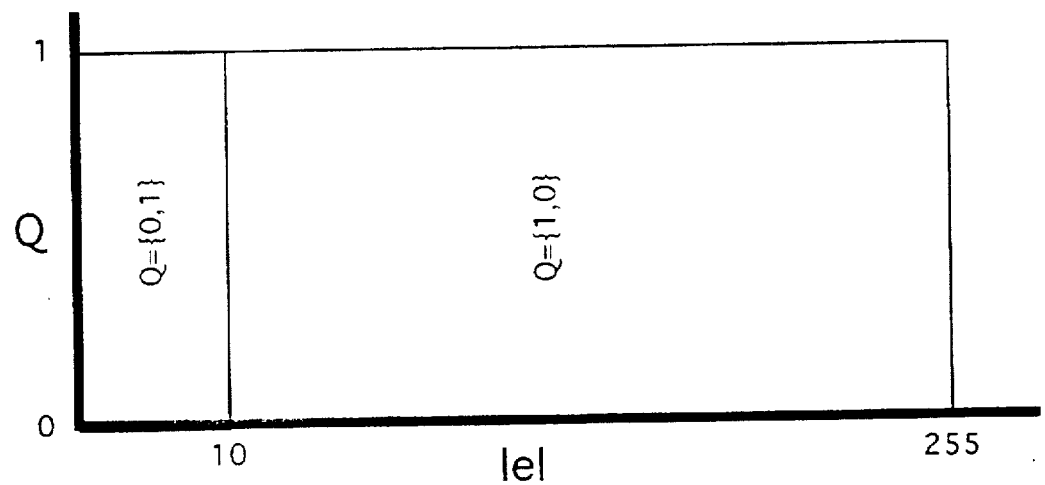
FIG. 13 is a sample graph describing a function for generating a weighting vector Q according to the present invention.
Figure 14:
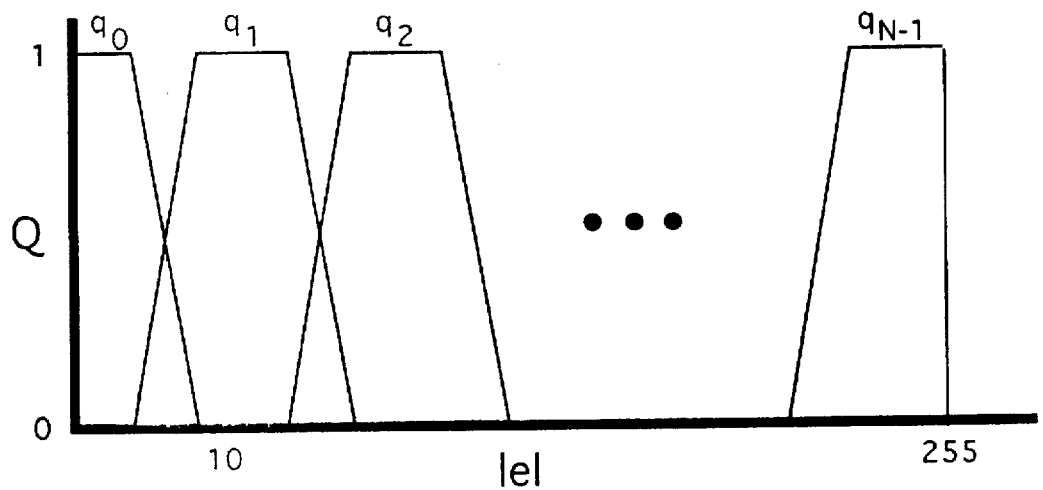
FIG. 14 is another sample graph describing a function for generating a weighting vector Q according to the present invention.

An example of an activity function 82 that can be used to switch between two input filters $F_0(i,j)$ and $F_1(i,j)$ is shown in FIG. 13, where |e| is the value of the activity signal. In this particular example, the value of the activity signal ranges from 0 to 255. For values of the activity signal between 0 and 10, $Q=\{0,1\}$, and the input filter $F_1(i,j)$ will be used. For values of the activity signal between 10 and 255, $Q=\{1,0\}$, and the input filter $F_0(i,j)$ will be used. In this way, the method of the present invention adapts the image processing based on the value of the activity signal. This feature can be generalized so that a different input filter is selected for each of N types of local scene content in the input image, as discriminated by the activity detector. Additionally, the use of the filters $F_0(i,j)$ through $F_{N-1}(i,j)$ can be blended in regions of the image where it is unclear exactly what type of scene content is present. An example of an activity function 82 which will accomplish this is shown in FIG. 14.

At the output of the input filter processor 81, it is desired that the average value of z(i,j) be equal to the average value of y(i,j) for uniform regions of the input image. One way of satisfying this average preserving relationship is to use filters $F_0(i,j)$ through $F_{N-1}(i,j)$ that are normalized (i.e., that satisfy the relationship $\Sigma_i\Sigma_j F(i,j)=1$), and impose the constraint that Q satisfies the relationship $\Sigma_i q_i=1$.

Figure 2:
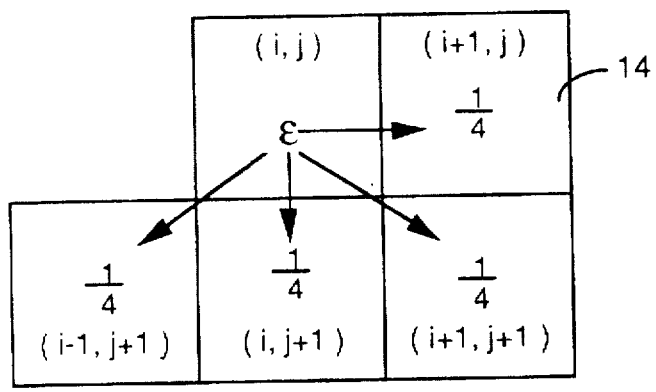
FIG. 2 shows typical sets of error weights used in the FIG. 1 arrangement.
Figure 3:
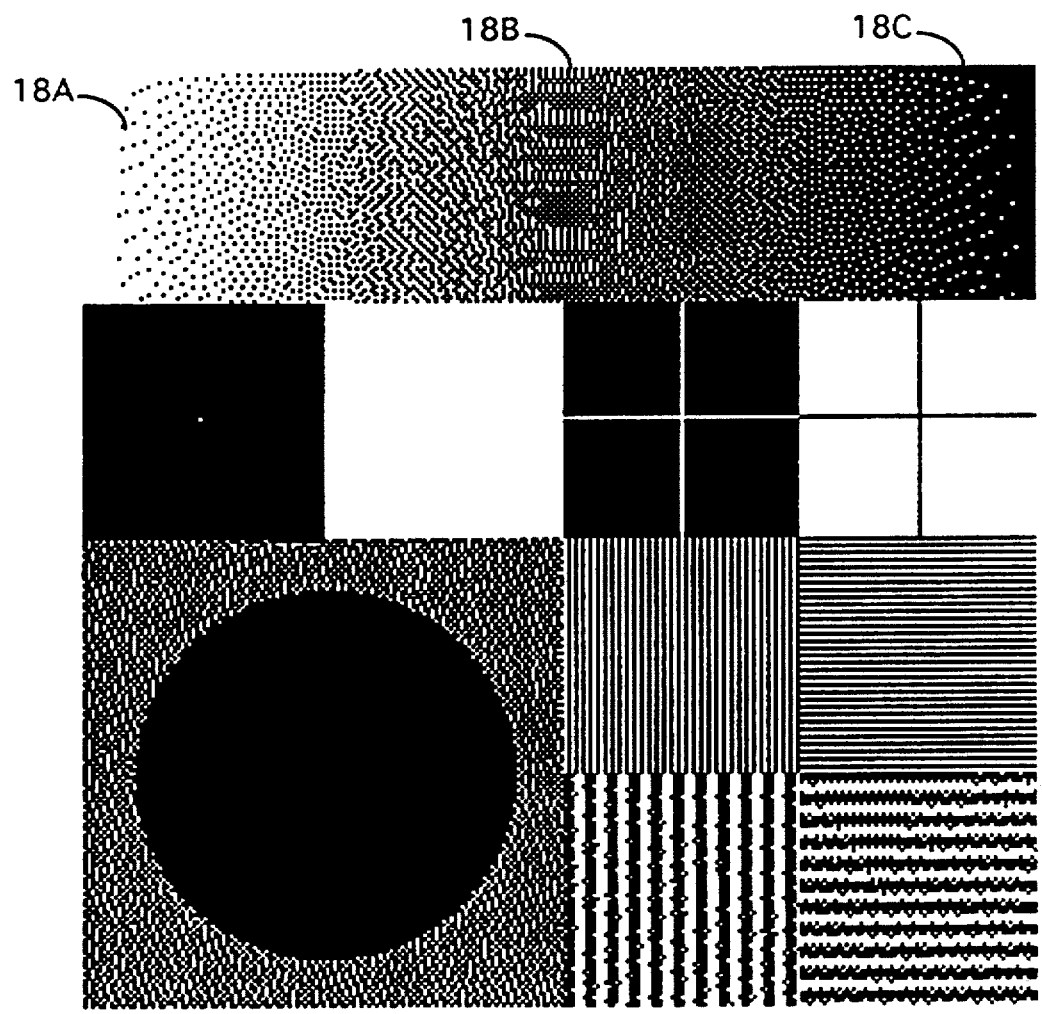
FIG. 3 depicts a sample image generated in accordance with the method of FIG. 1 which contains worm artifacts.
Figure 15:
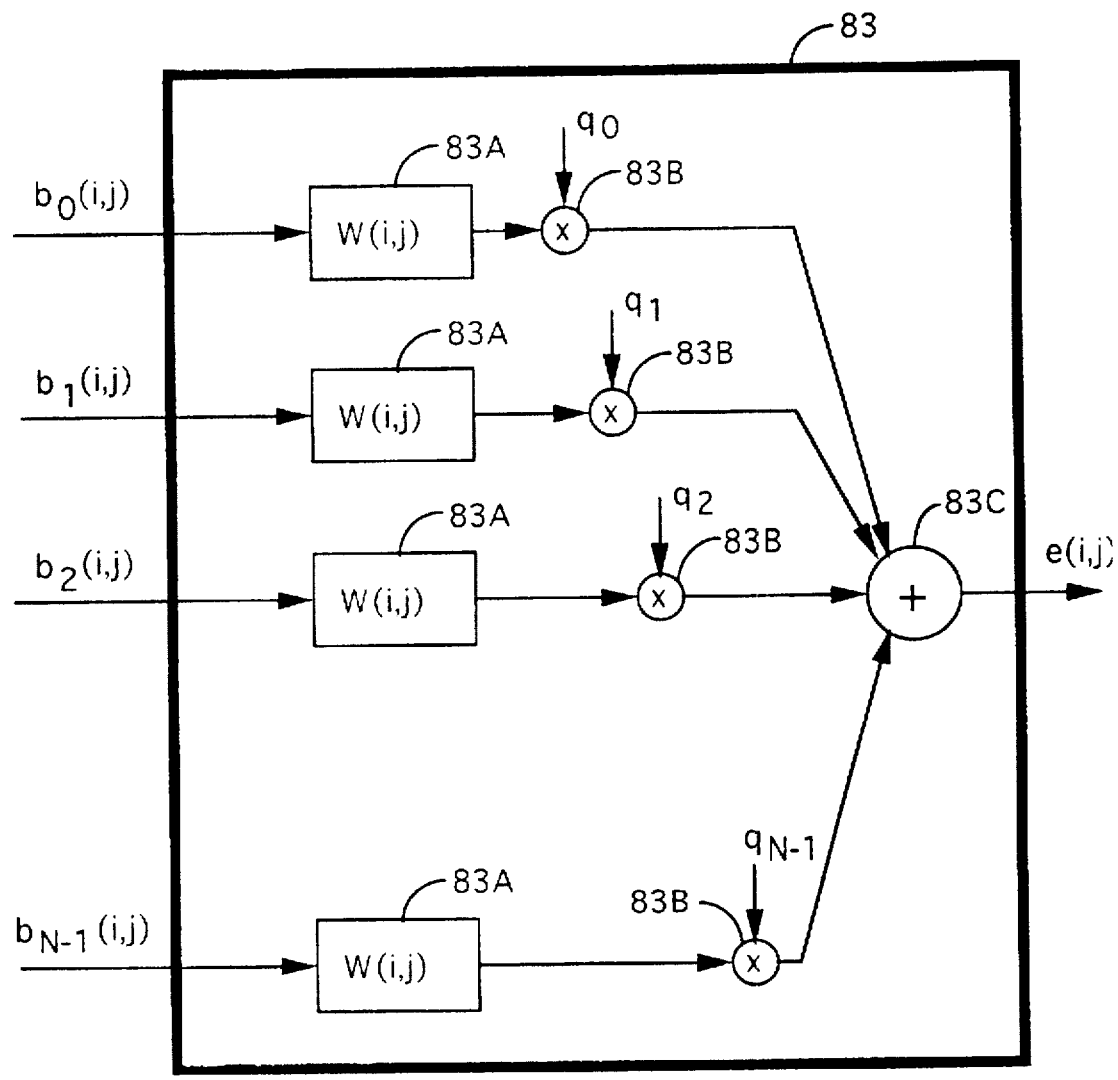
FIG. 15 is a logic diagram showing a weighting of the error buffers according to the present invention.

After the weighted filtered input signal z(i,j) is computed, the errors made by processing previous pixels are weighted by the error weights W(i,j) shown in FIG. 2 and by the weighting vector Q using a weighted error generator 83 (FIG. 11). The details of the weighted error generator 83 are shown in FIG. 15, in which error values stored in N separate error buffers $b_0(i,j)$ through $b_{N-1}(i,j)$, corresponding to the N types of local scene content, are individually weighted by W(i,j) using filtered error generators 83A, then weighted by the the weighting vector Q using multipliers 83B, and added together using an adder 83C to produce an error signal e(i,j). In this way, the errors generated in areas of the image that contain one type of scene content will not propogate to an area of the image that contains a different type of scene content. This type of separate error buffering is desirable to avoid artifacts that can be generated when the image contains a sharp boundary between areas of different scene content, such as the boundary between the crosshair patches and the horizontal and vertical stripe patches near the center right of FIG. 10.

Figure 16:
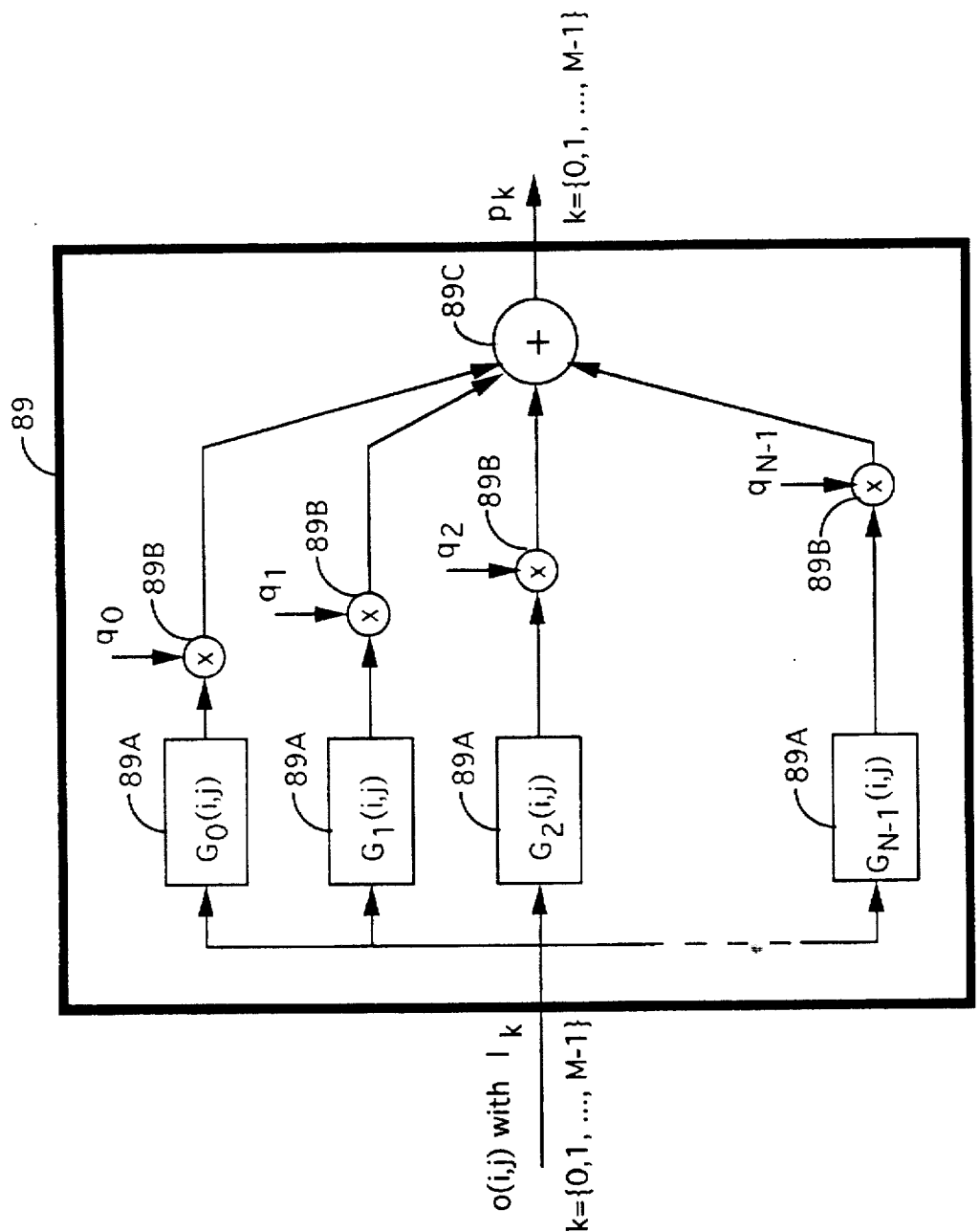
FIG. 16 is a logic diagram showing an output filtering operation according to the present invention.

Returning to FIG. 11, the error signal e(i,j) is added to the weighted input signal z(i,j) by an adder 88 to compute the desired signal d(i,j). An output filter processor 89 computes a set of M weighted filtered output values $p_0$ through $p_{M-1}$. This is done by digitally filtering the previously computed output values o(i,j) together with each of the M possible output levels 85 for the current pixel ($l_0$ through $l_{M-1}$) using filtered signal generators 89A and the bank of N filters $G_0(i,j)$ through $G_{N-1}(i,j)$ as shown in FIG. 16 to compute filtered output values. For each of the M possible output levels, the filtered output values corresponding to the N filters are weighted by the weighting vector Q using multipliers 89B, and added by an adder 89C to generate the weighted filtered output values, as shown in FIG. 16. The filtered output values only need to be computed for cases where the weights $q_k$ are non-zero.

Returning again to FIG. 11, once the weighted filtered output values $p_0$ through $p_{M-1}$ have been computed, a selector 86 chooses the output level $l_0$ through $l_{M-1}$ according to an error criterion. One such error criterion is to minimize the difference between the desired signal d(i,j) and the weighted filtered output values $p_0$ through $p_{M-1}$.

Figure 17:
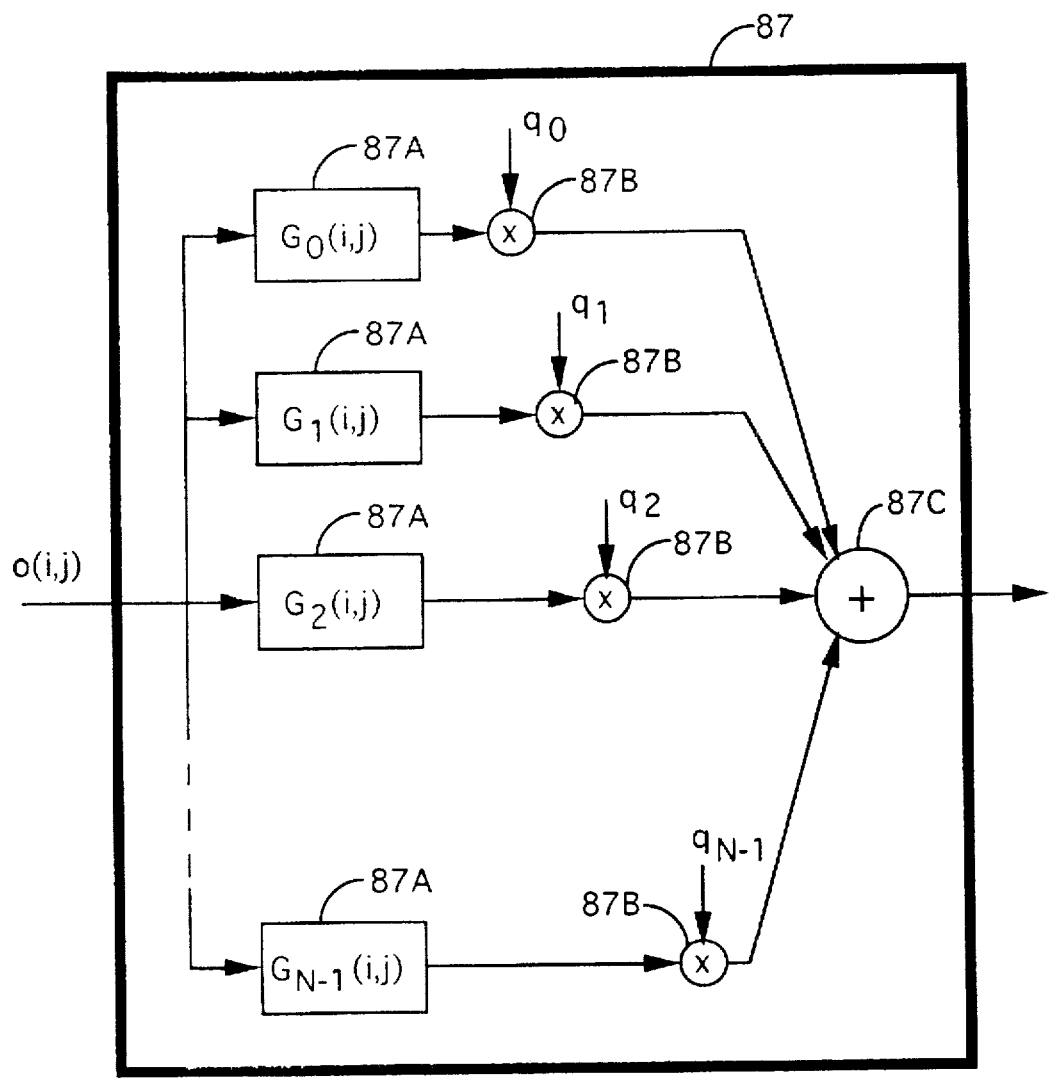
FIG. 17 is a logic diagram showing another output filtering operation according to the present invention.
Figure 18:
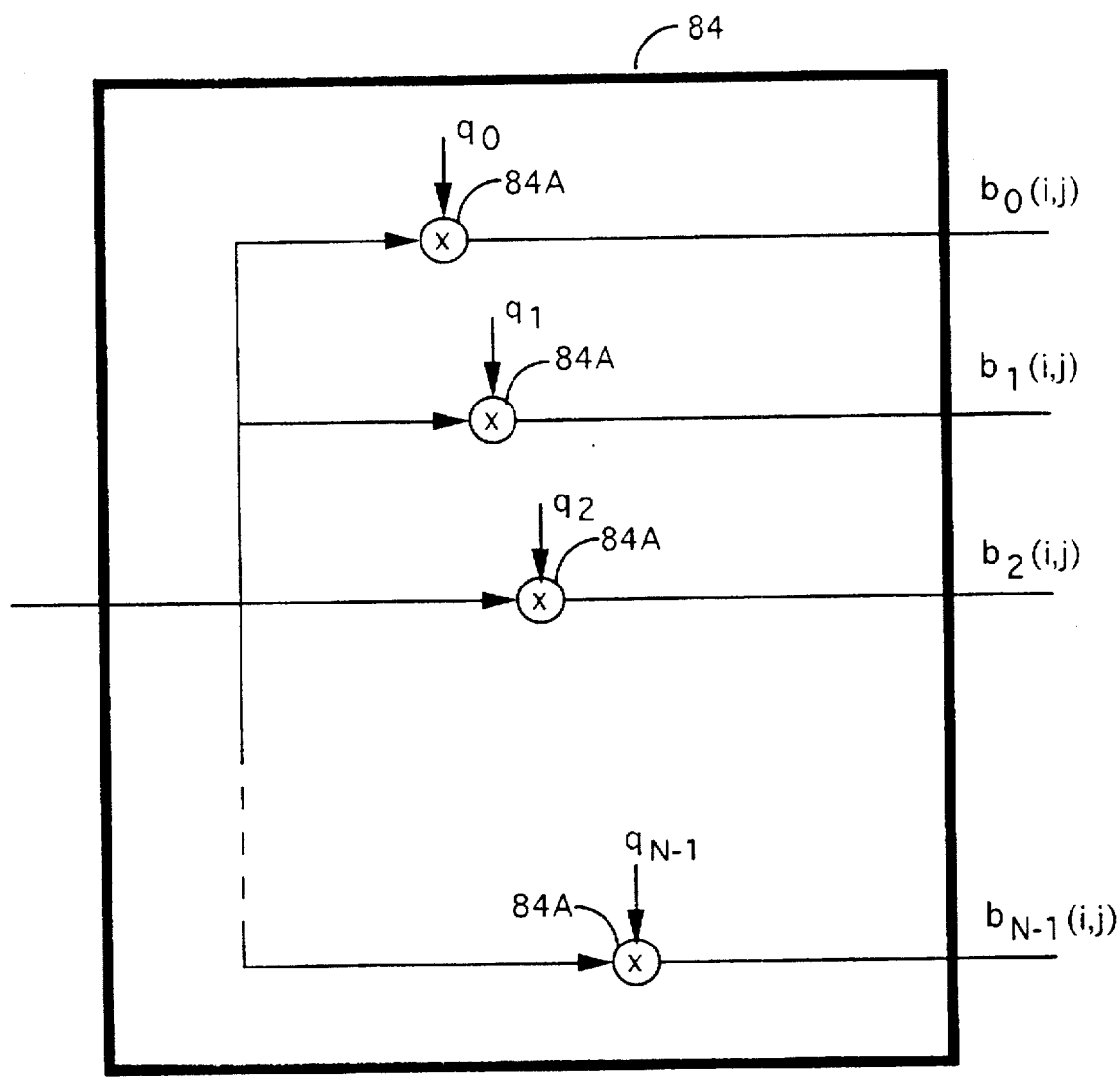
FIG. 18 is a logic diagram showing distributing error into separate error buffers according to the present invention.

Once a selection of an output level has been made, an output filter processor 87 digitally filters the output signal o(i,j) using filtered signal generators 87A and the bank of N filters $G_0(i,j)$ through $G_{N-1}(i,j)$, weights the results by the weighting vector Q using multipliers 87B, and adds the weighted values together using an adder 87C as shown in FIG. 17. An error signal generator 90 (FIG. 11) then generates an error signal by taking the difference between the value generated by the output filter processor 87 and the desired signal d(i,j). The error signal is then distributed into N error buffers $b_0$ through $b_{N-1}$ by an error distributor 84 which weights the error signal by the weighting vector Q using multipliers 84A as shown in FIG. 18. The values stored in the N error buffers $b_0$ through $b_{N-1}$ are then weighted by the weighted error generator 83 and added using the adder 88 to weighted filtered input pixels which have not yet been processed, as described earlier.

A sharpening pre-filter can be applied to the input image in order to restore the desirable edge sharpness. If the sharpening is implemented by a device which performs a convolution, then it is possible to incorporate the sharpening pre-filter directly into the input filtering operation 81 by convolving the sharpening pre-filter with the filters $F_0(i,j)$ through $F_{N-1}(i,j)$ to arrive at a new set of input filters. It may be desirable to only apply the sharpening filter to portions of the image which contain large amounts of activity. This can be accomplished by only incorporating the sharpening pre-filter into a subset of the filters $F_0(i,j)$ through $F_{N-1}(i,j)$ which correspond to large values of the activity signal.

Figure 19:
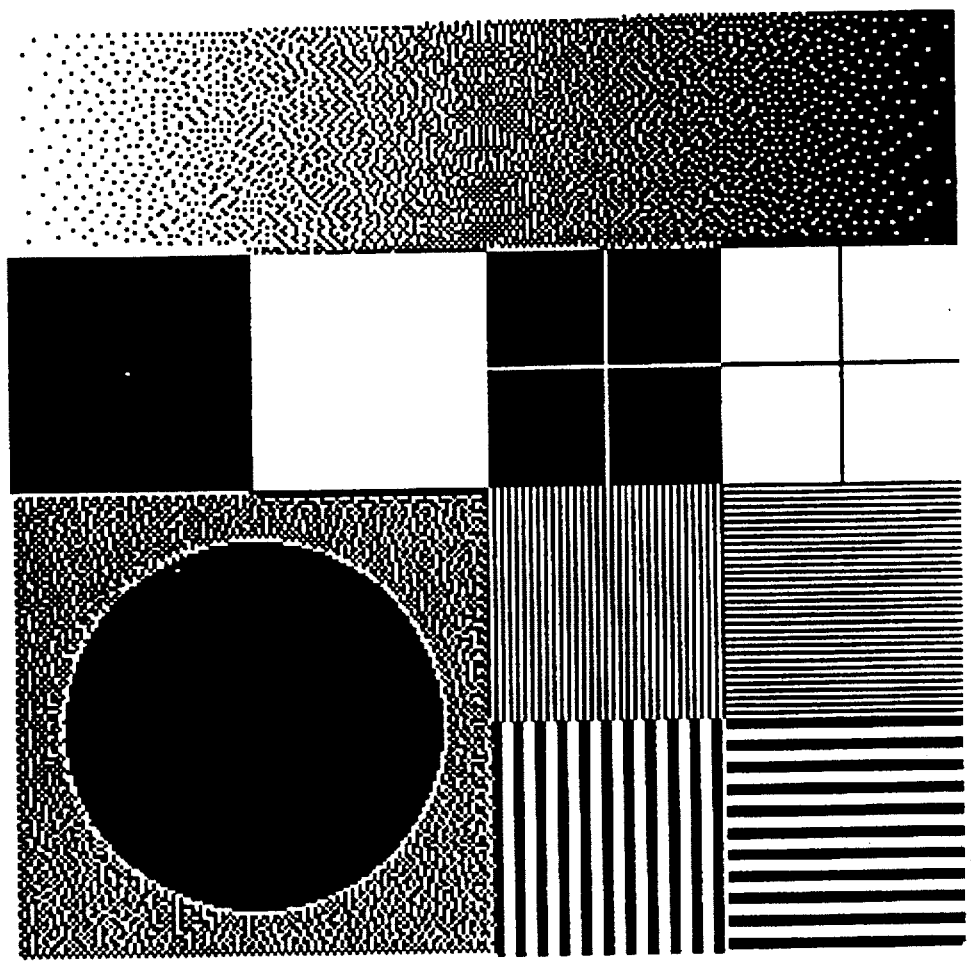
FIG. 19 depicts a sample image generated in accordance with the present invention.

A sample image generated using the method of the present invention is shown in FIG. 19. The activity function shown in FIG. 13 was used to switch between image regions having high and low activity signal values. The activity detector 80 used in this example was a local range detector. In regions of low activity, the input filter $F_1(i,j)$ used was a delta function $\delta(i,j)$, where $\delta(i,j)$ is defined as 1 for i=j=0 and 0 otherwise. As a result, the input filter operation reverts to a null operation and z(i,j) is equal to y(i,j). The output filter used for low activity regions $G_1(i,j)$ was set equal to the causal visual filter V(i,j) shown in FIG. 6.

In the high activity regions, the input filter $F_0(i,j)$ used was the sharpening filter 68 shown in FIG. 9. The output filter $G_0(i,j)$ used was the delta function $\delta(i,j)$.

Figure 1:
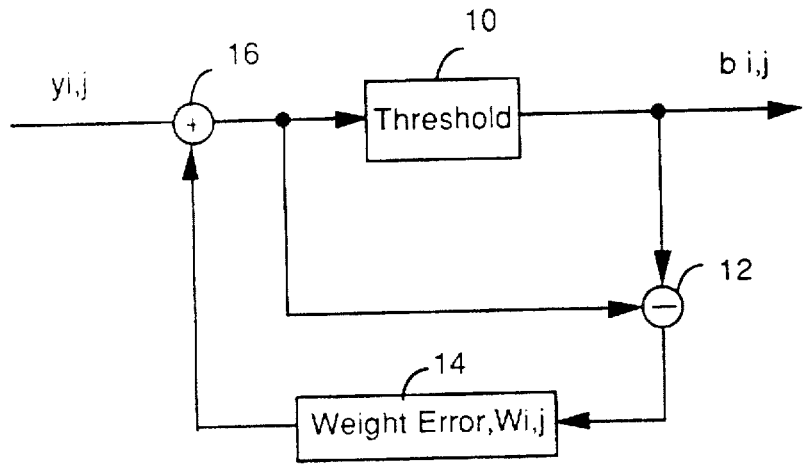
FIG. 1 is a logic diagram of a prior error diffusion process.
Figures 4, 5:
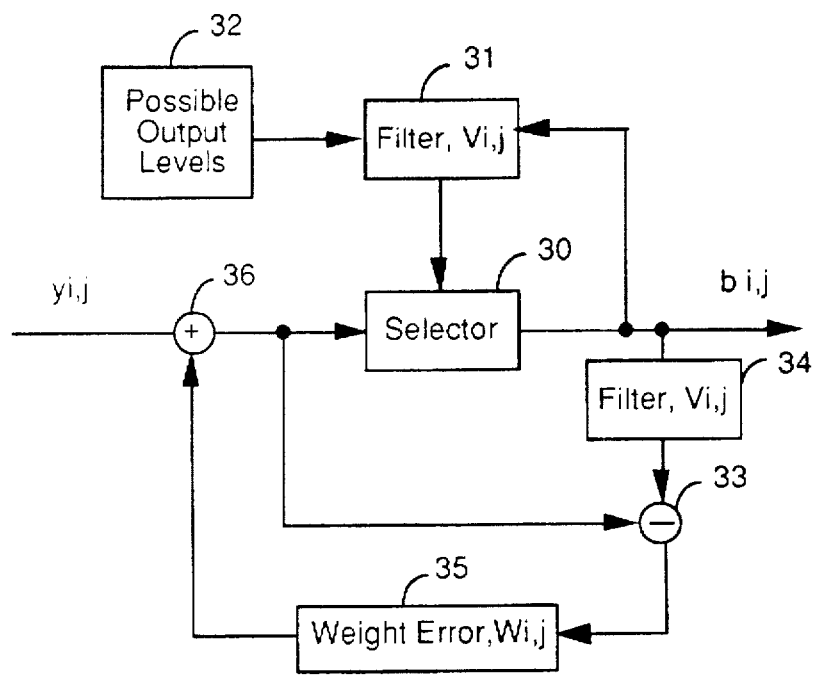
FIG. 4 is another logic diagram of a prior error diffusion process.
FIG. 5 depicts a causal visual filter array.

For values of the activity signal between 0 and 10, Q={0,1}, and the visual error diffusion method of FIG. 4 is used. Alternately, for values of the activity signal between 10 and 255, Q={1,0}, and the conventional error diffusion of FIG. 1 with a pre-sharpening step is used. In this way, the method of the present invention adapts the processing based on the value of the activity signal.

Figure 20:
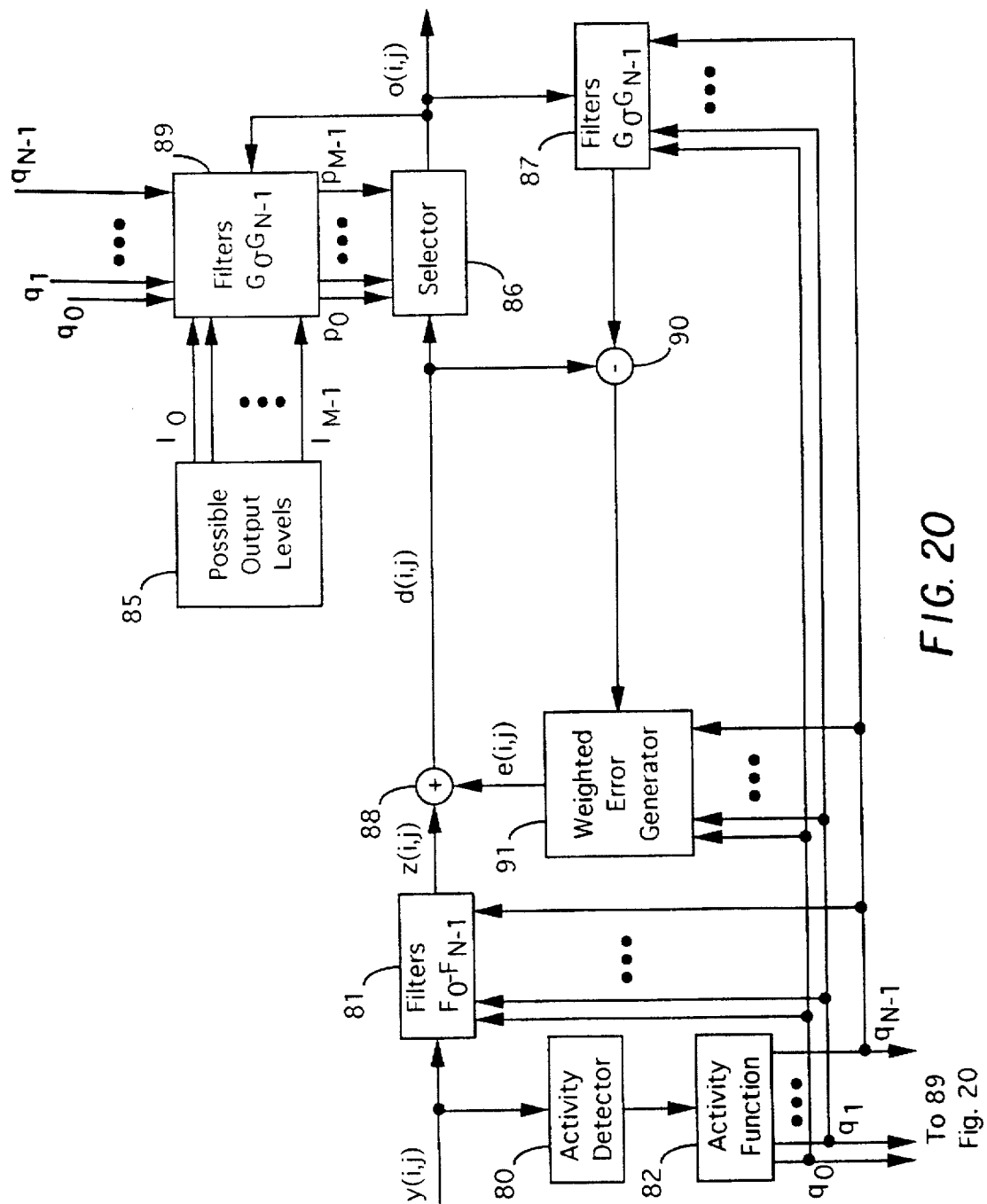
FIG. 20 is a logic diagram showing a method according to the present invention utilizing a single error buffer.

Another embodiment of the invention employs a single buffer to store the error signals generated by the error signal generator 90, as shown in FIG. 20. Comparing this with the method shown in FIG. 11, it can be seen that the N separate error buffers $b_0$ through $b_{N-1}$ have been eliminated and the error signal feeds directly into a weighted error generator 91. The weighted error generator 91 then computes a weighted error signal e(i,j) using the weighting vector Q and the error signal from the error signal generator 90.

Figure 21:
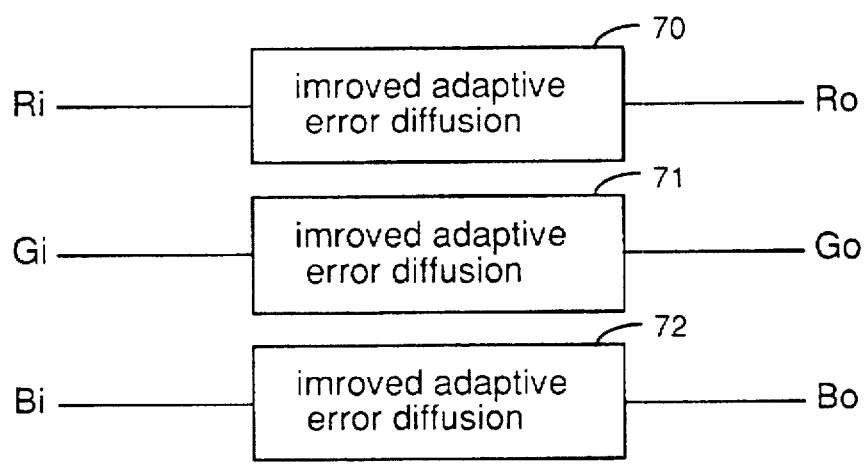
FIG. 21 is a logic diagram showing a method according to the present invention applied to each channel of a color image.

For color images, the method described above can be applied to each channel of the image as shown in FIG. 21. For example, if an image consists of red, green, and blue pixels, the improved adaptive error diffusion method can be applied via block 70 to the red pixels, and again to the green pixels and the blue pixels by block 71 and 72, respectively. Similarly, the improved adaptive error diffusion method can be applied to each channel of a 4-color cyan, magenta, yellow and black image. It may be desirable to use different input filters, output filters, activity lookup tables, error weights, activity functions, and/or sharpening filters can be used for each color channel.

Figure 22:
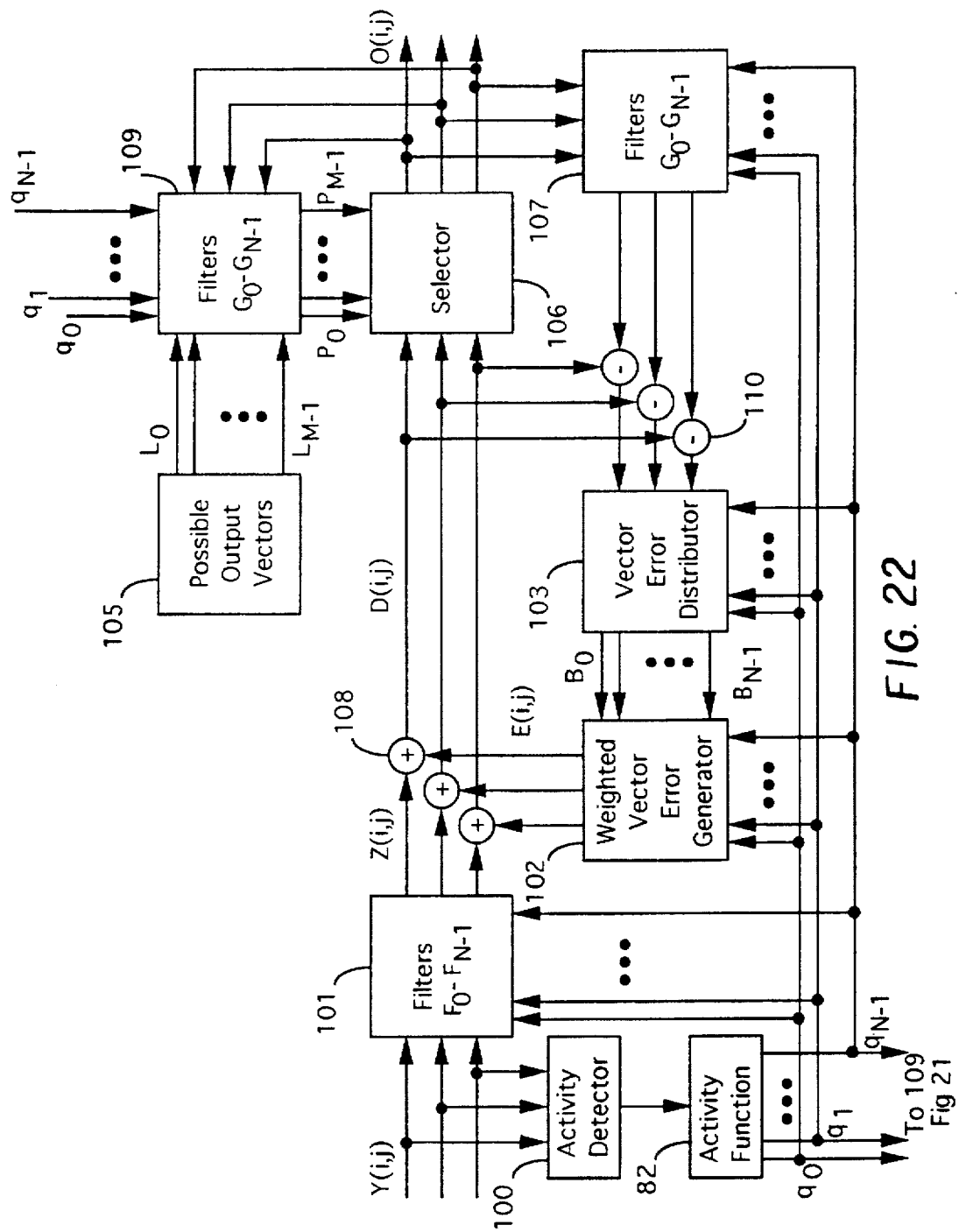
FIG. 22 is another logic diagram showing another method according to the present invention applied to each channel of a color image.

Another method of processing color images according to the present invention is to process all of the color channels simultaneously, as shown in FIG. 22. It can be seen that the logic of FIG. 22 is the same as the logic of FIG. 11, with the exception that the signals that are communicated between logical blocks are now vector signals, as opposed to scalar signals discussed in the method of FIG. 11. In the method of FIG. 22, the input continuous-tone pixel values for row i column j of the color channels are combined into a color vector Y(i,j). A vector activity detector 100 determines an activity signal from Y(i,j), and the activity function 82 determines a weighting vector Q from the activity signal. The input color vector Y(i,j) is then filtered by a vector input filter processor 101, which generates a filtered input color vector Z(i,j). A weighted color vector error E(i,j) is computed by a weighted color vector error generator 102 and added to Z(i,j) by a vector adder 108, resulting in a desired color vector D(i,j). A vector output filter processor 109 determines a set of weighted filtered output color vectors $P_0$ through $P_{M-1}$ by filtering previous output color vectors O(i,j) along with possible output color vectors 105 ($L_0$ through $L_{M-1}$) using a set of output filters $G_0$ through $G_{N-1}$ and the weighting vector Q. A selector 106 chooses an output color vector according to an error criterion. One such error criterion is the minimum vector distance between the desired color vector D(i,j) and the weighted filtered output color vectors $P_0$ through $P_{M-1}$. Once an output color vector has been chosen, a vector output filter processor 107 filters the output color vector O(i,j) using a set of output filters $G_0$ through $G_{N-1}$ and the weighting vector Q. A color vector error signal generator 110 computes a color vector error signal as the vector difference between the output of the output filter processor 107 and the desired color vector D(i,j). The color vector error signal is then distributed into N vector error buffers $B_0$ through $B_{N-1}$ using a vector error distributor 103 which is responsive to the weighting vector Q. The N vector error buffers $B_0$ through $B_{N-1}$ are then used by the weighted color vector error generator 102 to compute a weighted color vector error E(i,j) for use in processing future color vectors.

The invention has been described in detail with particular reference to certain preferred embodiments thereof, but it will be understood that variations and modifications can be effected within the spirit and scope of the invention.

Parts List 10 threshold 12 difference signal generator 14 weighted error generator
16 adder
18A worm artifact
18B worm artifact
18C worm artifact
19A anisotropic sharpening of edges
19B anisotropic sharpening of edges
20A ghost pixels
20B ghost pixels
20C ghost pixels
21A noise
21B noise
30 selector
31 visual filter
32 set of possible output levels
33 difference signal generator
34 visual filter
35 weighted error generator
36 adder
40 array element
42 array element
60 selector
61 visual filter
62 set of possible output levels
63 difference signal generator
64 visual filter
65 weighted error generator
66 adder
67 visual filter
68 sharpening filter
69 filter
70 improved visual error diffusion processor
71 improved visual error diffusion processor
72 improved visual error diffusion processor
80 activity detector
81 input filter processor
81A filtered signal generators
81B multipliers
81C adder
82 activity lookup table
83 weighted error generator
83A filtered error generators
83B multipliers
83C adder
84 error distributor
84A multipliers
85 set of possible output levels
86 selector
87 output filter processor
87A filtered signal generators
87B multipliers
87C adder
88 adder
89 output filter processor
89A filtered signal generators
89B multipliers
89C adder
90 error signal generator
91 weighted error generator
100 vector activity detector
101 vector input filter processor
102 weighted color vector error generator
103 vector error distributor
105 set of possible output color vectors
106 selector
107 vector output filter processor
108 vector adder
109 vector output filter processor
110 color vector error signal generator

We claim:

1. An error diffusion method suitable for producing an image from an input image having a set of digitized continuous-tone pixels, comprising the steps of:

a) computing an image activity signal;

b) filtering the digitized continuous-tone input pixels, where the filtering is responsive to the activity signal to produce a filtered input value;

c) filtering an output signal output from a selector wherein the filtering is responsive to the activity signal for each of a plurality of possible output levels;

d) selecting the output level in response to the filtered input value and the filtered output value for each of the plurality of possible output levels according to an error criterion;

e) determining an error signal between the filtered input value and the filtered value for the selected output value; and f) weighting the error signal and adjusting the filtered input values for nearby pixels which have not yet been processed.

2. The method of claim 1 further comprising computing a set of activity weights from the image activity signal.

3. The method of claim 2 wherein the number of possible output levels is 2.

4. The method of claim 2 wherein the output level selection step uses an error criterion which selects the output level that results in the smallest difference between the filtered input value and the filtered output value.

5. The method according to claim 2 wherein the filtered input value is computed by filtering the continuous tone pixels with a set of input filters and combining the results using the activity weights.

6. The method according to claim 2 wherein the filtered output value is computed by filtering the previously computed output values together with each of the possible output levels with a set of output filters and combining the results using the activity weights.

7. The method of claim 2 wherein the weighting the error signal step includes weighting the error signal as a function of the activity weights, storing such weighted error signals, and adjusting the stored weighted error signal as a function of a set of error weights and the activity weights.

8. The method according to claim 2 wherein the activity weights are provided by a look-up table in response to the image activity signal.

9. An error diffusion method according to claim 2 further including providing a plurality of color channels and applying steps a) through g) to each color channel.

10. An error diffusion method according to claim 2 wherein the image activity signal computing step includes comparing a plurality of continuous tone pixels neighboring the current pixel and providing an activity signal which is a function of local variation in the vicinity of the current pixel.

11. An error diffusion method according to claim 10 wherein the activity signal represents the range of the neighboring pixel values.

12. An error diffusion method according to claim 10 wherein the activity signal represents the variance of the neighboring pixel values.

13. An error diffusion method according to claim 10 wherein the activity signal is computed by convolving with an edge detection filter.

14. The method according to claim 10 wherein the activity weights are provided by a look-up table in response to the image activity signal.

15. The method of claim 2 wherein the number of activity weights is 2.

16. The method of claim 15 wherein the input filter corresponding to the first activity weight is a delta function, and the input filter corresponding to the second activity weight is a delta function.

17. The method of claim 15 wherein the output filter corresponding to the first activity weight is a visual filter, and the output filter corresponding to the second activity weight is a delta function.

18. The method of claim 15 wherein the input filter corresponding to the first activity weight is a delta function, the input filter corresponding to the second activity weight is a delta function, the output filter corresponding to the first activity weight is a visual filter, and the output filter corresponding to the second activity weight is a delta function.

19. The method of claim 15 wherin the input filter corresponding to the first activity weight is a delta function, and the input filter corresponding to the second activity weight is a sharpening filter.

20. The method of claim 15 wherein the input filter corresponding to the first activity weight is a delta function, the input filter corresponding to the second activity weight is a sharpening filter, the output filter corresponding to the first activity weight is a visual filter, and the output filter corresponding to the second activity weight is a delta function.

21. An error diffusion method suitable for producing an output color image from an input color image with a plurality of color channels having a set of digitized continuous-tone color vectors, comprising the steps of:

a) computing an image activity signal;

b) computing a set of activity weights from the image activity signal;

c) computing a filtered input color vector for a digitized continuous-tone input color vector responsive to the activity weights;

d) computing a filtered output color vector responsive to the activity weights for each of the possible output color vectors;

e) selecting the output color vector in response to the filtered input color vector and the filtered output color vector for each of the possible output color vectors according to an error criterion;

f) determining a color vector error signal between the filtered input color vector and the filtered output color vector for the selected output color vector; and g) weighting the color vector error signal and adjusting the filtered input color vectors for nearby continuous-tone input color vectors which have not yet been processed.

22. An error diffusion method suitable for producing an image from an input image having a set of digitized continuous-tone pixels, comprising the steps of:

a) computing an image activity signal;

b) filtering an output signal output from a selector wherein the filtering is response to the activity signal for each of a plurality of possible output levels for producing a filtered output value;

c) selecting an output level in response to 1) filtered digitized continuous-tone input pixels, where the filtering is responsive to the activity signal, to produce a filtered input value and 2) a filtered output value for each of the plurality of possible output levels according to an error criterion;

d) determining an error signal between the input value and the filtered output value for the selected output level; and e) weighting the error signal and adjusting the input values for nearby pixels which have not yet been processed.

23. An error diffusion method suitable for producing an image from an input image having a set of digitized continuous-tone pixels, comprising the steps of:

a) computing an image activity signal;

b) filtering the digitized continuous-tone input pixels, where the filtering is responsive to the activity signal to produce a filtered input value;

c) filtering an output signal output from a selector wherein the filtering is responsive to the activity signal for each of a plurality of possible output levels;

d) selecting an output level in response to the filtered input value and the filtered output value for each of the plurality of possible output levels according to an error criterion;

e) determining an error signal between the input value and the filtered output value for the selected output level; and f) weighting the error signal and adjusting the input values for nearby pixels which have not yet been processed.

* * * * *